United States Patent [19]
Ide et al.

[11] Patent Number: 5,095,305
[45] Date of Patent: Mar. 10, 1992

[54] LARGE DISPLAY APPARATUS USING DISCHARGE LAMPS AND DISCHARGE LAMP LOAD CIRCUIT FOR THE LARGE DISPLAY APPARATUS

[75] Inventors: Katsuyuki Ide; Shigeo Fukuhara, both of Yokohama; Tadashi Niisawa, Yokosuka, all of Japan

[73] Assignee: Toshiba Lighting & Technology Corporation, Tokyo, Japan

[21] Appl. No.: 401,633

[22] Filed: Aug. 31, 1989

[30] Foreign Application Priority Data

Aug. 31, 1988 [JP] Japan .................. 63-215019

[51] Int. Cl.$^5$ .................................. G09G 3/24
[52] U.S. Cl. .................. 340/780; 340/811; 340/813; 315/307
[58] Field of Search .......... 340/780, 811, 813, 777; 315/307, DIG. 7, 205, 207, 312, 313, 314, 315, 316, 317, 318, 319, 324; 307/41, 156, 157

[56] References Cited

U.S. PATENT DOCUMENTS

| | | |
|---|---|---|
| 3,280,341 | 10/1966 | Du Vall . |
| 3,962,700 | 6/1976 | Criscimagna et al. . |
| 4,009,335 | 2/1977 | Payne et al. . |
| 4,241,294 | 12/1980 | Fisler . |
| 4,367,464 | 1/1983 | Kurahashi et al. . |
| 4,414,544 | 11/1983 | Suste . |
| 4,438,453 | 3/1984 | Alston . |
| 4,442,428 | 4/1984 | Dean et al. . |
| 4,488,089 | 12/1984 | Shota . |
| 4,495,445 | 1/1985 | Turney . |
| 4,581,655 | 4/1986 | Ide et al. . |
| 4,633,141 | 12/1986 | Weber . |
| 4,635,052 | 1/1987 | Aokie et al. . |
| 4,645,979 | 2/1987 | Chow . |
| 4,682,083 | 7/1987 | Alley .................. 315/307 |
| 4,757,238 | 7/1988 | Rhee .................. 315/324 |
| 4,839,564 | 6/1989 | Ide et al. . |
| 4,937,505 | 6/1990 | Déglon et al. .......... 315/307 |

FOREIGN PATENT DOCUMENTS

| | | |
|---|---|---|
| 46-5894 | 2/1971 | Japan . |
| 48-30797 | 9/1973 | Japan . |
| 59-180586 | 10/1984 | Japan . |
| 60-70490 | 4/1985 | Japan . |
| 61-15194 | 1/1986 | Japan . |
| 61-158398 | 7/1986 | Japan . |
| 62-14695 | 1/1987 | Japan . |

*Primary Examiner*—Ulysses Weldon
*Attorney, Agent, or Firm*—Cushman, Darby & Cushman

[57] ABSTRACT

A high frequency power source is coupled with a capacitor of a large capacitance. An electric power of the power source is supplied to a plurality of discharge lamps repsectively through lamp load circuits associated therewith. Each load circuit includes a transformer limiting current to the lamp, and a switching means for selectively supplying the electric power from the power source to the lamp, through the transformer. Two types of the switching means, open control type and short control type, are used for the switching means of the discharge load circuit.

13 Claims, 3 Drawing Sheets

LARGE DISPLAY APPARATUS USING DISCHARGE LAMPS AND DISCHARGE LAMP LOAD CIRCUIT FOR THE LARGE DISPLAY APPARATUS

BACKGROUND OF THE INVENTION

1. Field of the Invention

The present invention relates to a large display apparatus having a matrix of a number of discharge lamps, for displaying various types of images including characters by controlling the light-on of the discharge lamps. The present invention relates also to a discharge lamp load circuit in the large display apparatus for controlling the light-on of the discharge lamps for an intentional image formation.

2. Description of the Related Art

The large display apparatus called a large image display apparatus or a large color electric display board has been used in a stadium, for example. The display apparatus has a matrix of a great number of discharge lamps. To display various of images and characters, the light-on and light-off of the lamps and/or intensities of lights emitted from the lamps must be controlled intentionally.

The discharge lamp load circuit, by convention, includes a high frequency power source, switching means coupled between each the lamps and the high frequency power source, and control means for turning on/off the switching means. To light on a lamp, the switching means is turned on by the control means to allow current to the lamp. Particularly, to control an intensity of light from a lamp, viz., a gradation of the lamp, a pulse width of a signal applied to the switching means is controlled by the control means. During a period of time as defined by the controlled pulse width, the switching means allows current to be fed to the lamp. The pulse width control is systematically applied to all of the lamps to form a desired image.

Various types of large display apparatuses and discharge lamps load circuits contained therein have been proposed. Some specific examples of them are enumerated: Published Unexamined Japanese Patent Application Nos. 59-180586 (corresponding to U.S. Pat. No. 4,635,052), 60-70490, 61-15194 (U.S. patent application Ser. No. 749,435 and its continuation-in-part Application No. 207,932), 61-158398, and 62-14695, and U.S. patent application Ser. No. 595,532.

The high frequency power source may be constructed with a full-bridge inverter. When the full-bridge inverter is used, a capacitor is coupled with the power source. Provision of the capacitor is for obtaining an improved power factor against a variation of a load including a current-limiting impedance constituted by inductances and a resistive element constituted by discharge lamps or display elements.

When a capacitance of the capacitor is small, the influence by the inductive load is great at the rated load point, and hence the power source efficiency is degraded. When the capacitor has a large capacitance, the power source efficiency is satisfactory at the rated load point, but where the load is small or the number of lighting lamps is small, the influence by the capacitive load is great and the power source efficiency is degraded.

SUMMARY OF THE INVENTION

Accordingly, an object of the present invention is to provide a large display apparatus which provides a satisfactory power factor in excessive capacitive region resulting from a variation of a load.

Another object of the present invention is to provide a large display apparatus which can use a capacitor of a large capacitance for a high frequency power source, with a satisfactory power factor.

A yet another object of the present invention is to provide a discharge lamp load circuit for a large display apparatus which provides a satisfactory power factor in excessive capacitive region resulting from a variation of a load.

According to one aspect of the present invention there is provided a large display apparatus using discharge lamps comprising: a display board having a matrix of discharge lamps; an AC power source coupled with a capacitor to improve a power factor; a plurality of lamp load circuits each coupled between each the lamp and the AC power source, each the lamp load circuit including an inductance for serving as a current-limiting element for each the lamp and switching means allowing an electric power to selectively be supplied from the AC power source to the lamp in association with the switching means per se, each the switching means including one of (A) an open control type switching means as a switch coupled in series with the lamp and (B) a short control type switching means as a switch connected to the inductance and in parallel with the lamp, and the plurality of load circuits including a plurality of the short control type switching means and a plurality of the open control type switching means; and control means for selectively turning on and off the switching means to light on and off the lamps and to present a desired display on the display board.

According to another aspect of the present invention, there is provided a large image display apparatus using discharge lamps comprising: a display board having a matrix of discharge lamps; a high frequency power source coupled with a capacitor to improve a power factor; a plurality of discharge lamp gradation load circuits each coupled between each the lamp and the high frequency power source, each the discharge lamp gradation load circuit including an inductance for serving as a current-limiting element for each the lamp and switching means allowing an electric power to selectively be supplied from the high frequency power source to the lamp in association with the switching means per se, each the switching means including one of (A) an open control type switching means as a switch coupled in series with the lamp and (B) a short control type switching means as a switch connected to the inductance and in parallel with the lamp, and the plurality of discharge lamp gradation load circuits including a plurality of the short control type switching means and a plurality of the open control type switching means; video signal generating means for generating a video signal; and control means for selectively turning on and off the plurality of switching means in accordance with a video signal generated by the video signal generating means and at the same time controlling an ON period of time of the switching means in accordance with the video signal, thereby to control gradations of the lamps and to present an image based on the video signal.

According to a further aspect of the present invention, there is provided a discharge lamp gradation load circuit in use with a large display apparatus having a high frequency power source coupled with a capacitor to improve a power factor and a plurality of discharge lamps, the display apparatus visually presenting information by selectively lighting on the lamps, the discharge lamp gradation load circuit selectively lighting on the lamps by selectively supplying an electric power from the high frequency power source to the lamps selected in accordance with a video signal and for a period of time dependent on the video signal, comprising a plurality of first discharge lamp gradation load circuit means coupled with the high frequency power source and the lamps, each including a first inductance for serving as a current-limiting element for the lamp, first control signal receiving means for receiving a first control signal in accordance with the video signal, and open control type switching means connected in series with the lamp, the open control type switching means allowing an electric power from the high frequency power source to be fed to the lamp associated therewith through the first inductance, in accordance with the first control signal received at the first control signal receiving means and during a period of time dependent on the video signal; and a plurality of second discharge lamp gradation load circuit means coupled with the high frequency power source and the lamps, each including a second inductance serving as a current-limiting element for the lamp, second control signal receiving means for receiving a second control signal based on the data to be displayed, and short control type switching means connected to the second inductance and in parallel with the lamp, the short control type switching means allowing an electric power from the high frequency power source to be fed to the lamp associated therewith through the second inductance, in accordance with the second control signal received at the second control signal receiving means and during a period of time dependent on the video signal.

DETAILED DESCRIPTION OF THE PREFERRED EMBODIMENTS

A large display apparatus according to an embodiment of the present invention will be described with reference to the accompanying drawings.

Figure 1:
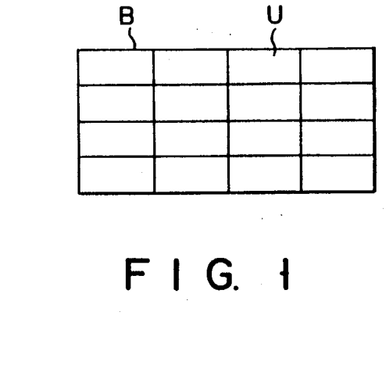
FIG. 1 is a plan view showing a display board of a large image display apparatus to which the present invention is applied.
Figure 2:
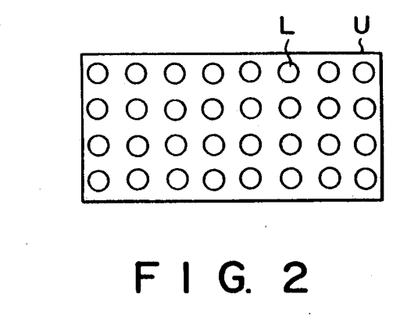
FIG. 2 is a plan view showing a display unit assembled into the display board of FIG. 1.

The large display apparatus, e.g., a large image display apparatus, is provided with a display board B including a plurality of display units U, which are arrayed in a matrix fashion, as shown in FIG. 1. Each display unit U also includes a matrix of discharge lamps L, as shown in FIG. 2.

Figure 3:
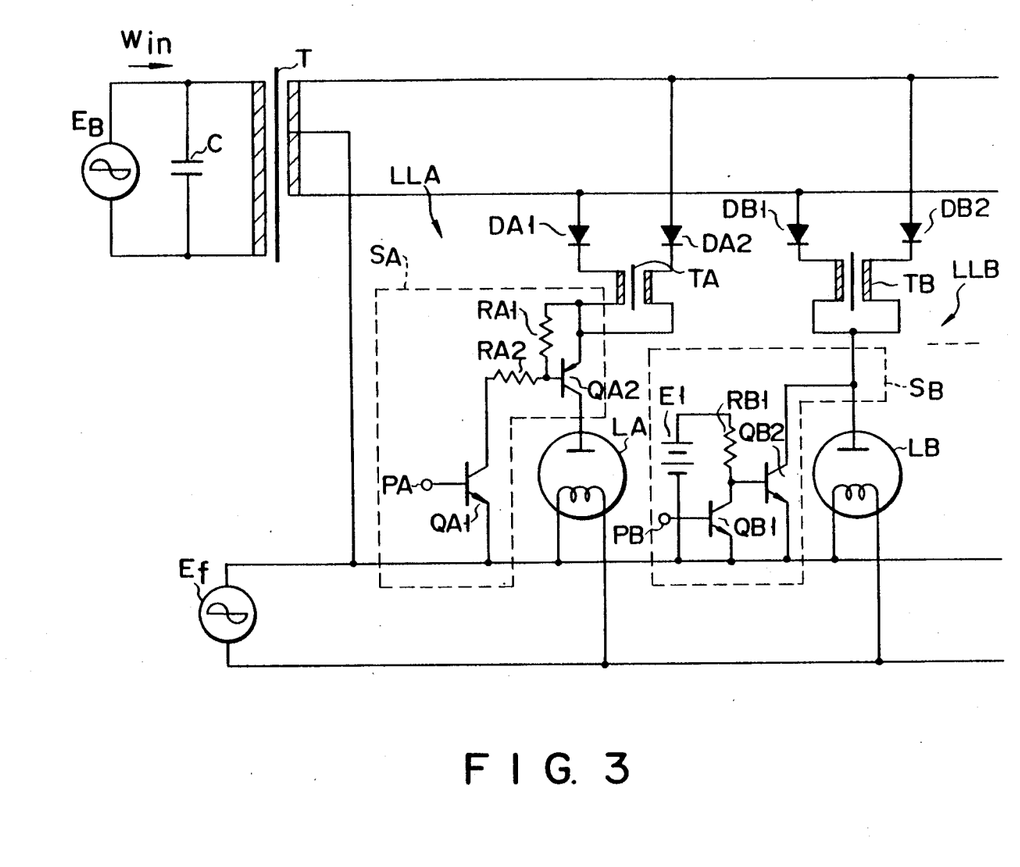
FIG. 3 is a circuit diagram showing a lamp load circuit according to an embodiment of the present invention.

To display various images on the board B of the large image display apparatus, it is necessary to control the light-on of the lamps L on the display board B, particularly the gradation of the lamps L. FIG. 3 shows a discharge lamp load circuit for controlling the lighting of the lamps L. In the circuit, two discharge lamps LA and LB are typically used, for ease of explanation. As shown, a high frequency power source $E_B$ is coupled in parallel with the primary winding of an output transformer T and a capacitor C for power factor improvement. The term "high frequency" means frequency of several hundreds Hz or more, preferably between 20 kHz to 50 kHz. A high frequency generator, which is available for the high frequency power source $E_B$, is disclosed in U.S. Pat. No. 4,635,052. The high frequency generator is able to generate a voltage of such a high frequency from a DC power source by the inverter technique.

The secondary winding of the output transformer T is connected to the lamps LA and LB through a couple of lamp (gradation) load circuits LLA and LLB respectively containing switching means $S_A$ and $S_B$. The load circuit LLA includes a full-wave rectifying diodes DA1 and DA2 and a current limiting transformer TA. The load circuit LLB likewise includes a full-wave rectifying diodes DB1 and DB2 and a current limiting transformer TB. A first end of the secondary winding of the output transformer T is connected to the switching means $S_A$, through the diode DA1 and one winding of the transformer TA in the load circuit LLA. Similarly, the first end of the secondary winding is also connected to the switching means $S_B$, through the diode DB1 and one of the windings of the transformer TB in the load circuit LLB. A second end of the secondary winding of the output transformer T is connected to the switching means $S_A$, through the diode DA2 and the other winding of the transformer TA in the load circuit LLA. Similarly, the second end of the secondary winding is also connected to the switching means $S_B$, through the diode DB2 and the other winding of the transformer TB in the load circuit LLB.

The mid tap of the secondary windings of the output transformer T is connected to the cathodes of the lamps LA and LB. The cathodes of the lamps are further coupled with a power source $E_f$ for heating the filaments of the lamps LA and LB.

Two types of switching means, an open control and a short control, are used in this instance. The switching means $S_A$ is of the open control type, while the switching means $S_B$ is of the short control type.

As shown, the open control type switching means $S_A$ is made up of an npn transistor QA1, pnp transistor QA2, and resistors RA1 and RA2. A terminal PA is coupled with the base of the transistor QA1. The terminal PA receives a pulse signal with a variable pulse width to effect the light-on control, particularly the gradation control. The emitter of the transistor QA1 is connected to the cathode of the lamp LA. The collector of the transistor QA1 is connected to the transformer TA, through resistors RA1 and RA2. A node between the resistors RA1 and RA2 is coupled with the base of the transistor QA2. The emitter of the transistor QA2 is connected to the transformer TA, and its collector is connected to the anode of the lamp LA.

The switching means $S_B$ of the short control type is made up of a bias power source E1, npn transistors QB1 and QB2, and resistor RB1. A terminal PB receives a pulse signal of a variable pulse width to effect the light-on control and the gradation control. The terminal PB is connected to the base of the transistor QB1. The emitter of the transistor QB1 is connected to the cathode of the lamp LB. The bias power source E1 is connected to the collector of the transistor RB1 and the base of transistor QB2, through the resistor RB1. The emitter of the transistor QB2 is connected to the anode of the lamp LB coupled with the transformer TB.

An operation of the switching means $S_A$ thus arranged follows. Firstly, a pulse signal of an appropriate pulse width is applied to the terminal PA. During a period that the pulse signal is in a high level, the transistor QA1 is turned on. In turn, the transistor QA2 is turned on, so that electric power is fed to the lamp LA. When the input pulse signal is in a low level, the transistors QA1 and QA2 are turned off. Under this condition, no electric power is fed to the lamp LA. Accordingly, if the pulse width of the pulse signal applied to the terminal PA is appropriately controlled, it is possible to control a gradation of the lamp LA. In the case of the mere light-on control, there is no need for the control by the pulse width.

An operation of the switching means $S_B$ of the short control type follows. Firstly, a pulse signal of an appropriate pulse width is applied to the terminal PB. During a period that the pulse signal is in a low level, the transistor QB1 is turned off. Then, the transistor QB2 is turned on with an assist of the power source E1. Under this condition, the circuit of the switching means $S_B$ is shorted through the transistor QB2, and a pregiven current flows through the collector-emitter path of the transistor QB2. When the input pulse signal is in a high level, the transistor QB1 is turned on. In turn, the transistor QB2 is turned off to allow electric power to be fed to the lamp LB. Accordingly, by controlling the pulse width of the pulse signal applied to the terminal PB, it is possible to control the gradation of the lamp LB. For the light-on control, no pulse width control is required.

In the large image display apparatus according to the present invention, the combinations of the open control type switching means $S_A$ and the short control type switching means $S_B$ are employed for controlling the light-on or the gradation of lamps.

Figure 4:
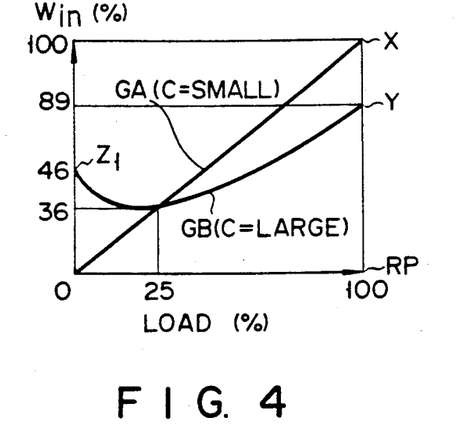
FIG. 4 is a graph showing a variation of input electric power with respect to load when an open control type switching means is used for the lamp load circuit.
Figure 5:
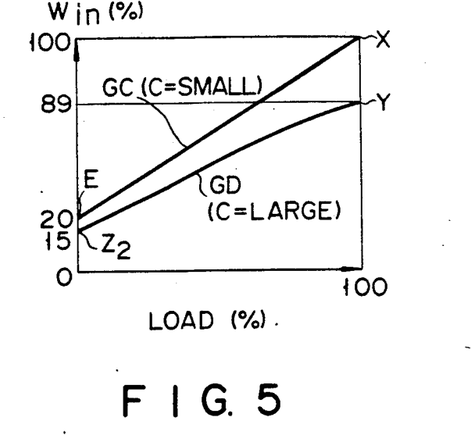
FIG. 5 is a graph showing a variation of input electric power with respect to load when a short control type switching means is used for the lamp load circuit.
Figure 6:
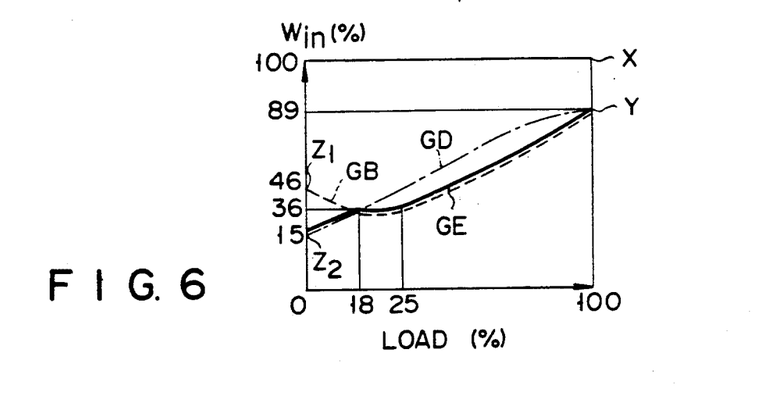
FIG. 6 is a graph showing a variation of input electric power with respect to load when the open control type switching means and the short control type switching are used for the lamp load circuit.

FIGS. 4 to 6 are graphs showing variations of input power $W_{in}$ with respect to a quantity of load (number of lighting lamps). In those graphs, the control types of switching means in the lamp (gradation) load circuit are different from one another. In FIG. 4, only the switching means $S_A$ of the open control type is used; in FIG. 5, only the switching means $S_B$ of the short control type is used; and in FIG. 6, the combination of the switching means $S_A$ of the open control type and the switching means $S_B$ of the short control type is used.

In the lamp (gradation) load circuit using only the switching means $S_A$ of the open control type, the input power $W_{in}$ varies with respect to a quantity of load, as shown in FIG. 4. When a capacitance C of the capacitor C coupled with the high frequency power source $E_B$ is small, the input power $W_{in}$ linearly varies from a nonpower point 0 (0%) to a rated power point X (100%). The power variation is indicated by a straight line GA. On the other hand, when the capacitance of the capacitor C is large, the input power $W_{in}$ varies from point $Z_1$ (46% of the rated power) to point Y (89% of the rated power) along a curve GB. As seen from the graph, when the capacitor C is small, the influence by the inductive load (lamp (gradation) load circuit) is great at point RP of the rated load (100%), and hence the power factor is decreased. When the capacitor C has a large capacitance, the power factor is increased at the rated load point RP, but in the region where the load is small, for example, the load is 25% or less of the rated load, the influence by the capacitive load is great and hence a loss of the input power $W_{in}$ is created.

When only the switching means $S_B$ of the short control type is used for the lamp (gradation) load circuit, a variation of the input power $W_{in}$ with respect to the load is as shown in FIG. 5. When the capacitance of the capacitor C coupled with the high frequency power source $E_B$ is small, the input power $W_{in}$ varies along a straight line GC in the range from point E corresponding to 20% of the rated power to point X of the rated power (100%), in accordance with the number of the lighting lamps. When the capacitor C has a large Capacitor, the input power $W_{in}$ varies along a curve GD in the range between point $Z_2$ corresponding to 15% to corresponding to 89% of the rated power.

As already mentioned, the instant embodiment employs the combination of the switching means $S_A$ of the open control type and the switching means $S_B$ of the short control type for the lamp (gradation) load circuit. With such an arrangement, the input power $W_{in}$ varies with respect to the load, as shown in FIG. 6. In the figure, a curve GB ranging between point $Z_1$ and point Y is the same as the curve GB in FIG. 4. A curve GD indicated by a one-dot-chain line and ranging between point $Z_2$ and point Y is the same as the curve GD in FIG. 5. A variation of the input power $W_{in}$ in this instance is represented by a curve GE indicated by a continuous line in FIG. 6. As seen from the curve GE, when the load is small, the characteristic of the curve GD is exhibited. When the load is large, the characteristic of the curve GB is exhibited. Thus, the instant embodiment has the characteristic represented by the curve GE. Accordingly, the input power $W_{in}$ is saved and a good efficiency is secured. Experiments conducted by the inventors showed that to obtain the Characteristic of the curve GE, it is preferable to use the short control type switching means $S_B$ for the number of lamps amounting to the load of 18% to 25% of the full load (total number of lamps).

Figure 7:
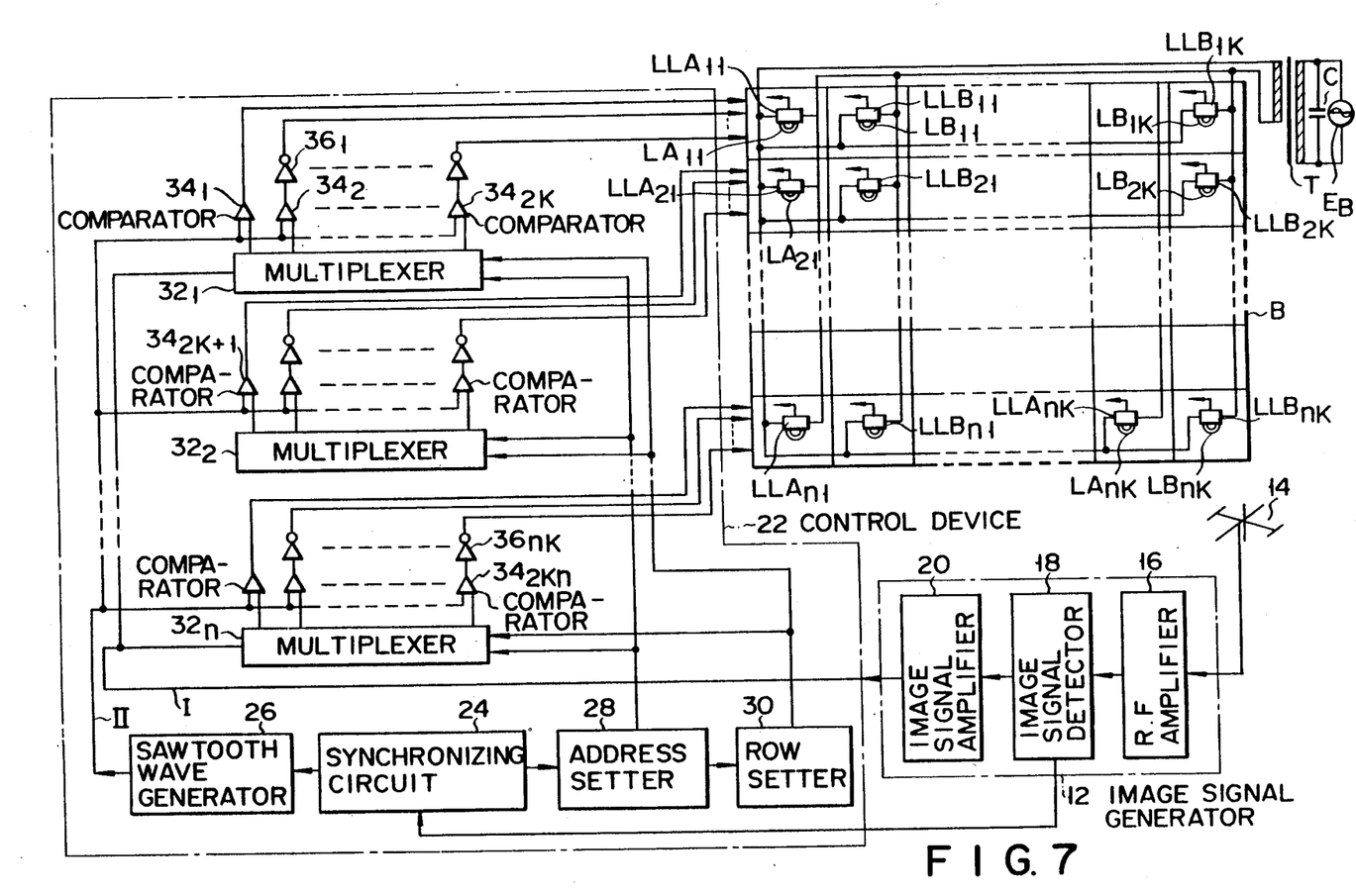
FIG. 7 is a block diagram showing a circuit arrangement of the large image display apparatus according to another embodiment of the present invention.

FIG. 7 shows a block diagram of the large image display apparatus according to an embodiment of the present invention in which the combinations of the switching means $S_A$ of the open control type and the switching means $S_B$ of the short control type are used for the lamp (gradation) load circuit. As shown, the display board B includes a matrix of discharge lamps LA and LB. More specifically, in each row of the matrix, lamps LA of "k" are linearly arrayed, which are respectively coupled with lamp load circuits LLA of "k". The lamp (LA)—load circuit (LLA) pairs of "n" is linearly arrayed in each column. Also in each row of the matrix, lamps LB of "k" are linearly arrayed, which are respectively coupled with lamp load circuits LLB of "k". The lamp (LB)—load Circuit (LLB) pairs of "n" is linearly arrayed in each of the columns adjacent to those containing the LLA—LA pairs.

Reference numeral 12 in FIG. 7 denotes an image signal generator for generating an image signal to be displayed on the display board B. The generator 12 can display an image of a television signal, a video signal, or a movie signal. The generator 12 generates a television signal in this embodiment. The generator 12 is comprised of an RF amplifier 16 for amplifying a signal from an antenna 14, an image signal detector 18, and an image signal amplifier 20, and is well known in the art.

Reference numeral 22 denotes a control device for controlling the quantities of light emitted from the lamps $LA_{11}$, $LB_{11}$, ..., $LB_{nk}$ in response to a television signal in units of frames (having 1/60 second period) generated from the generator 12, thereby displaying an image on the board B. The device 22 controls optical outputs from the lamps $LA_{11}$, $LB_{11}$, ..., $LB_{nk}$ in response to the monochrome luminous intensities represented by the image signals. The gradations are 8, 16, and 32 levels, or are represented by continuous gradation.

In this embodiment, the control device 22 comprises a synchronizing circuit 24 for generating a synchronizing signal in accordance with an output of the image signal detector 28 of the image signal generator 12, a saw tooth generator 26 controlled by the circuit 24 to generate a saw tooth wave synchronized with the image signal, an address setter 28 controlled by the circuit 24 to set the addresses of the lamps $LA_{11}$ to $LB_{1k}$ which are aligned in line on the board B, a row setter 30 for shifting addressing for the next row elements when the address setter 28 completes outputting of address signals for one-row elements $LA_{11}$ to $LB_{1k}$, multiplexers $32_1$ to $32_n$ which constitute n rows in the board B to receive the image signal from the generator 12, comparators $34_1$ to $34_{2kn}$ arranged in units of 2k comparators for each multiplexer so as to compare the image signal with the saw tooth wave, and inverters $36_1$ to $36_{nk}$ for inverting the outputs from the comparators $34_2$, ..., $34_{2kn}$ corresponding to lamps $LB_{11}$, ..., $LB_{1k}$, ..., $LB_{nk}$.

In this case, the outputs of the comparators $34_1$, ..., $34_{2k+1}$ ..., $34_{2kn-1}$ are respectively supplied to the lamp load circuits $LLA_{11}$, ..., $LLA_{2k}$, ..., $LLA_{nk}$ coupled with the lamps $LA_{11}$, $LA_{21}$, ..., $LA_{nk}$. The outputs of the comparators $34_2$, ..., $34_{2k}$, ..., $34_{2kn}$ are respectively supplied through the inverters $36_1$ to $36_{nk}$ to the lamp load circuits $LLB_{11}$, ..., $LLB_{1k}$, ..., $LLB_{nk}$ couple with the lamps $LB_{11}$, ..., $LB_{1k}$, ..., $LB_{nk}$.

The control device 22 and the image signal generator 12 are housed in the board B, attached thereto, or mounted in a remote control room (not shown).

Figure 8A:
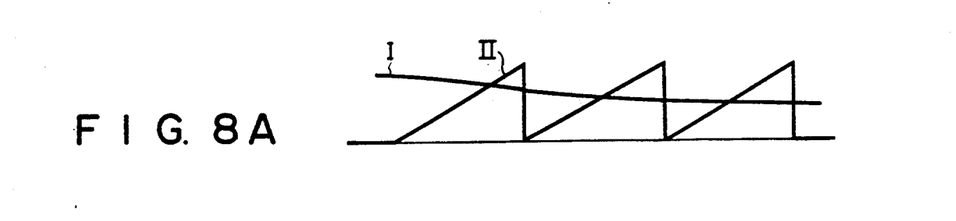
FIGS. 8A to 8C show waveforms useful in explaining the operation of the display apparatus of FIG. 7.
Figure 8B:
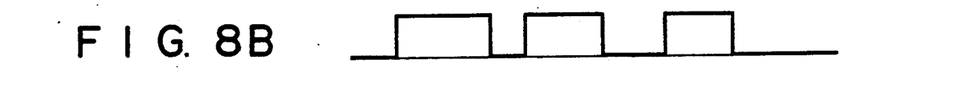

In operation, when the multiplexer $32_1$ is controlled by the setters 28 to 30 to generate a signal I shown in FIG. 8A acting as the image signal corresponding to the lamp $LA_{11}$ among the lamps $LA_{11}$ to $LB_{1k}$, the comparator $32_1$ compares the output I representing this image signal and an output II from the generator 26. The comparator $32_1$ generates a signal (FIG. 8B) for determining the ON time of the high frequency voltage applied to the lamps $LA_{11}$.

This output signal is supplied to the load circuit $LLA_{11}$ coupled with the lamp $LA_{11}$. More specifically, the lamp load circuit $LLA_{11}$ has an arrangement like that LLA as already mentioned. The output signal of the comparator $34_1$ is applied to the terminal PA. Accordingly, during a period of time corresponding to the pulse width of the output signal of the comparator $34_1$, an electric power is fed from the open control type switching means $S_A$ to the lamp $LA_{11}$, consequently to control the gradation of the lamp.

The magnitude of the output I in FIG. 8A represents the luminous intensity of the image signal. When the output I is increased, the high frequency voltage ON time of the lamp $LA_{11}$ is increased to emit whitish light. On the other hand, when the output I is small, the optical output is decreased to emit dimmed light. Since the period of the saw tooth wave output II is synchronized by the circuit 24 with the television signal, the light from the lamp $LA_{11}$ is changed in accordance with the period of the image signal. The remaining lamps are controlled in the same manner as described above. Applied to the lamp coupled with the lamp load circuit having the open control type switching means $S_B$ is the signal obtained by inverting the output signal of the comparator by the inverter.

Figure 8C:
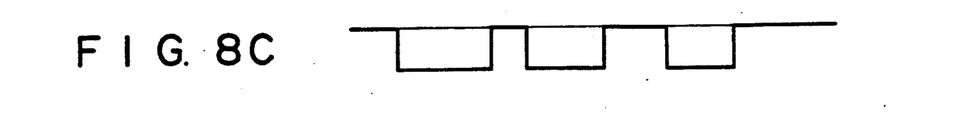

To be more specific, it is assumed that the multiplexer $32_1$ in the control device 22 is controlled by the address setter 28 and the column setter 30, a signal I as shown in FIG. 8A is outputted as a video signal applied to the lamp $LB_{11}$ of those lamps $LA_{11}$ to $LB_{1k}$. The comparator $34_2$ compares this output I with the output II of the saw tooth wave generator 26. As the result of the comparison, the comparator $34_2$ produces a signal (FIG. 8B) to determine a period of time during which the high frequency voltage is allowed to be fed to the lamp $LB_{11}$. The output is applied to the inverter $36_1$ which in turn produces the inverted signal as shown in FIG. 8C.

The output signal of the inverter 361 is supplied to the load circuit $LLB_{11}$ coupled with the lamp $LB_{11}$. The load circuit $LLB_{11}$ has an arrangement like that LLB as already mentioned. The output signal of the inverter $36_1$ is applied to the terminal PB. Accordingly, an electric power as defined by the period corresponding to the pulse width of the output signal of the inverter $36_1$ is fed from the short control type switching means $S_B$. Thus, the gradation control of the lamp $LB_{11}$ is effected. When the first row elements in the board B are driven, the second-row multiplexer $32_2$ is addressed by the row setter 30 to control the lamps $LA_{21}$ to $LB_{2k}$ in the same manner as described above. When the n-th multiplexer addresses the corresponding elements, the next cycle is initiated to display the television image on the board B.

As described above, with the use of the combinations of the open control type switching means $S_A$ and the short control type switching means $S_B$, the capacitor coupled with the high frequency power source for power factor improvement may have the possibly largest capacitance. Therefore, the power source is effectively operable with the feed of a less input power.

What is claimed is:

1. A large display apparatus using discharge lamps comprising:
   a display board including a matrix of a plurality of discharge lamps, the plurality of discharge lamps including a first group of lamps and a second group of lamps;
   an AC power source coupled with a capacitor to improve a power factor;
   a first group of lamp load circuits, each lamp load circuit being coupled between one lamp of said first group of lamps and said AC power source, each lamp load circuit of said first group of lamp load circuits including
  a first inductor for serving as a current-limiting element for a corresponding lamp of said first group of lamps, and
  first switching means for allowing electric power to be selectively supplied from said AC power source to said corresponding lamp of said first group of lamps, each said first switching means including open control type switching means coupled in series with said corresponding lamp of said first group of lamps;
a second group of lamp load circuits each coupled between one lamp of said second group of lamps and said AC power source, each lamp load circuit of said second group of lamp load circuits including
  a second inductor for serving as a current-limiting element for a corresponding lamp of said second group of lamps, and
  second switching means for allowing electric power to be selectively supplied from said AC power source to said corresponding lamp to said second group of lamps, each said second-type switching means including short control type switching means connected to said second inductor in parallel with said corresponding lamp of said second group of lamps; and
control means for selectively turning said first and second switching means on and off to turn said lamps of said first and second groups of lamps on and off so as to prevent a desired display on said display board.

2. A large image display apparatus using discharge lamps comprising:
a display board including a matrix of a plurality of discharge lamps, said plurality of discharge lamps having a first group of lamps and a second group of lamps;
a high frequency power source coupled with a capacitor to improve a power factor;
a first group of discharge lamp gradation load circuits each coupled between one lamp of said first group of lamps and said high frequency power source, each discharge lamp gradation load circuit of said first group of discharge lamp gradation load circuits including
  a first inductor for serving as a current-limiting element for a corresponding lamp of said first group of lamps, and
  first switching means for allowing electric power to be selectively supplied from said high frequency power source to said corresponding lamp of said first group of lamps, each said first switching means including open control type switching means coupled in series with said corresponding lamp of said first group of lamps;
a second group of discharge lamp gradation load circuits each coupled between one lamp of said second group of lamps and said high frequency power source, each discharge lamp gradation load circuit of said second group of discharge gradation load circuits including
  a second-group inductor for serving as a current-limiting element for a corresponding lamp of said second group of lamps, and
  second switching means for allowing electric power to be selectively supplied from said high frequency power source to said corresponding lamp of said second group of lamps, said second switching means including short control type switching means connected to said second inductor in parallel with said corresponding lamp of said second group of lamps;
video signal generating means for generating a video signal; and
control means for selectively turning said plurality of said first and second switching means on and off in accordance with a video signal generated by said video signal generating means and at the same time controlling ON period of said first and second switching means in accordance with said video signal, thereby controlling gradations of said first and second groups of lamps and to present an image based on said video signal.

3. The apparatus according to claim 2, wherein said control means includes:
a first pulse signal generating means in association with each said first switching means, said first pulse signal generating means generating a first pulse signal for turning each said first switching means on and off in accordance with said video signal, and ON period of each said first switching means being determined by a pulse width of said first pulse signal; and
a second pulse signal generating means in association with each said second switching means, each second pulse signal generating means generating a second pulse signal for turning each said second switching means on and off in accordance with said video signal, and ON period of each of said second switching means being determined by a pulse width said second-type pulse signal.

4. The apparatus according to claim 3, wherein each said open control type switching means includes
  a first transistor switch between said first inductor and said corresponding lamp of said first group of lamps and
  a second transistor switch for turning said first transistor switch on and off, said first transistor switch including a pnp transistor whose emitter is connected to said first inductor and whose collector is connected to one end of said corresponding lamp of said first group of lamps, and said second transistor switch including a first npn transistor whose base is connected to a control terminal for receiving said first pulse signal from said first pulse signal generating means associated therewith, whose emitter is connected to the other end of said corresponding lamp of said first group of lamps and whose collector is connected to the base of said pnp transistor, and
each said short control type switching means includes
  a third transistor switch connected in parallel with said corresponding lamp of said second group of lamps and a fourth transistor switch for turning said third transistor switch on and off, said third transistor switching including a second npn transistor whose emitter is connected to one end of said corresponding lamp of said second group of lamps and whose collector is connected to a node between said second inductor and the other end of said corresponding lamp of said second group of lamps, and said fourth transistor switch comprising a third npn transistor whose base is connected to a control terminal for receiving said second pulse signal from said second pulse signal generating means associated therewith, whose emitter is connected to said one end of said corresponding lamp of said second group of lamps and whose collector is connected to the base of said second npn transistor.

5. The apparatus according to claim 4, wherein said second pulse signal generating means associated with said short control type switching means further includes means for inverting and supplying said pulse signal generated to said control terminal.

6. A discharge lamp gradation load circuit in use with a large image display apparatus having a high frequency power source coupled with a capacitor to improve a power factor and a plurality of discharge lamps, said display apparatus visually presenting information by selectively turning on said lamps, said discharge lamp gradation load circuit selectively turning on said lamps by selectively supplying electric power from said high frequency power source to said lamps selected in accordance with a video signal and for a period of time dependent on said video signal, said plurality of discharge lamps having a first group of lamps and a second group of lamps, comprising:

a plurality of first discharge lamp gradation load circuit means coupled with said high frequency power source and said first group of lamps, each including
a first inductor for serving as a current limiting element for one lamp of said first group of lamps,
first control signal receiving means for receiving a first control signal in accordance with said video signal, and
open control type switching means connected in series with a corresponding lamp of said first group of lamps, said open control type switching means allowing electric power from said high frequency power source to be fed to said corresponding lamp of said first group of lamps associated therewith through said first inductor, in accordance with said first control signal received at said first control signal receiving means and during a period of time dependent on said video signal; and a plurality of second discharge lamp gradation load circuit means coupled with said high frequency power source and said second group of lamps, each including
a second inductor for serving as a current-limiting element for said lamp of said second group of lamps,
second control signal receiving means for receiving a second control signal based on the data to be displayed, and
short control type switching means connected to said second inductor and in parallel with a corresponding lamp of said second group of lamps,
said short control type switching means allowing electric power from said high frequency power source to be fed to said corresponding lamp of said second group of lamps associated therewith through said second inductor, in accordance with said second control signal received at said second control signal receiving means and during a period of time dependent on said video signal.

7. The circuit according to claim 6, wherein said first and second control signals include a pulse signal to turn on said open control type and short control type switching means in accordance with said video signal, and ON period of said open control type and short control type switching means is determined by a pulse width of said pulse signal.

8. The circuit according to claim 7, wherein said open control type switching means includes a first transistor switch between said first inductor and said corresponding lamp of said first group of lamps and a second transistor switch for turning said first transistor switch on and off, said first transistor switch including a pnp transistor whose emitter is connected to said first inductor and whose collector is connected to one end of said corresponding lamp of said first group of lamps, and said second transistor switch including a first npn transistor whose base is connected to said first control signal receiving means, whose emitter is connected to the other end of said corresponding lamp of said first group of lamps, and whose collector is connected to the base of said pnp transistor, and said short control type switching means includes a third transistor switch connected in parallel with said corresponding lamp of said second group of lamps and a fourth transistor switch for turning said third transistor switch on and off, said third transistor switch including a second npn transistor whose emitter is connected to one end of said corresponding lamp of said second group of lamps and whose collector is connected to a node between said second inductor and the other end of said corresponding lamp of said second group of lamps, and said fourth transistor switch including a third npn transistor whose base is connected to said second control signal receiving means, whose emitter is connected to the one end of said corresponding lamp of said second group of lamps, and whose collector is connected to the base of said second npn transistor.

9. The circuit according to claim 8, wherein said first control signal receiving means of said first discharge lamp gradation load circuit means receives a first pulse signal to determine ON period of said open control type switching means by a pulse width of the first pulse signal when at a high level, and
said second control signal receiving means of said second discharge lamp gradation load circuit means receives a second pulse signal to determine ON period of said short control type switching means by a pulse width on the second pulse signal when at a low level.

10. A display apparatus for displaying images, comprising:
a display board having a first and a second group of discharge lamps;
an AC power source;
a group of first-type load circuits for turning on and off said first group of discharge lamps, each first-type load circuit coupling one lamp of said first group of discharge lamps and said AC power source, and having
a first inductance connected to said AC power source and
a first-type switch connected to said first inductance and said one lamp of said first group of discharge lamps, including
an open control transistor switch coupled in series with said first inductance and said one lamp of said first group of discharge lamps;
a group of second-type load circuit for turning on and off said second group of discharge lamps, each second-type load circuit coupling one lamp to said second group of discharge lamps and said AC power source, and having
    a second inductance connected to said AC power source and
    a second-type switch coupling said second inductance to said one lamp of said second group of discharge lamps, including
        a short control transistor switch coupled in parallel with said one lamp of said second group of discharge lamps and said second inductance;
control means for selectively turning on and off each of said open control transistor switches and said short control transistor switches; and
a video signal generating means for generating a video signal and for outputting the video signal to said control means,
said control means further comprising means for receiving and processing said video signal to generate turn-on signals to each of said first-type switches and each of said second-type switches.

11. A display apparatus as in claim 10, wherein said control means further comprises:
    a group of first-type pulse signal generating means for supplying a plurality of turn-on signals to said each of said first-type switches; and
    a group of second-type pulse signal generating means for supplying a plurality of turn-on signals to said each of said second-type switches,
    wherein ON-periods of said first-type and said second-type switches depend on pulse widths of said turn-on signals.

12. A display apparatus as in claim 11, wherein said open control transistor switch includes:
    a first transistor switch for turning on and off said one lamp of said first group of discharge lamps, the first transistor switch being placed between said first inductance and said one lamp of said first group of discharge lamps, and including
        a pnp transistor whose emitter is connected to said first inductance and whose collector is connected to one of ends of said one lamp of said first group of discharge lamps, and
    a second transistor switch for turning on and off said first transistor switch, the second transistor switch being connected to said first transistor switch and including
        an npn transistor whose base receives one of said turn-on signals from said first-type pulse signal generating means, whose emitter is connected to other of said ends of said one lamp of said first group of discharge lamps, and whose collector is connected to a base of said pnp transistor.

13. A display apparatus as in claim 11, wherein said short control transistor switch includes:
    a first transistor switch for tuning on and off said one of said second group of discharge lamps, the first transistor switch being connected in parallel with said one lamp of said second group of discharge lamps and including
        a first npn transistor whose emitter is connected to one end of said one lamp of said second group of discharge lamps, whose collector is connected to a node connecting said second inductance and other end of said one lamp of said second group of discharge lamps; and
    a second transistor switch for turning on and off said first transistor switch, the second transistor switch being connected to said first transistor switch and including
        a second npn transistor whose base receives one of said turn-on signals from one of said second-type pulse signal generating means, whose emitter is connected to said one end of said one lamp of said second group of discharge lamps, and whose collector is connected to a base of said first npn transistor.

* * * * *